(12) United States Patent
Nyachoto

(10) Patent No.: US 7,321,218 B2
(45) Date of Patent: Jan. 22, 2008

(54) BICYCLE DERAILER GENERATOR

(75) Inventor: Powell D. Nyachoto, 2804 Stratford Dr., San Ramon, CA (US) 94583

(73) Assignee: Powell D. Nyachoto, San Ramon, CA (US)

( * ) Notice: Subject to any disclaimer, the term of this patent is extended or adjusted under 35 U.S.C. 154(b) by 196 days.

(21) Appl. No.: 10/439,862

(22) Filed: May 19, 2003

(65) Prior Publication Data

US 2004/0232880 A1    Nov. 25, 2004

(51) Int. Cl.
*H01M 10/46* (2006.01)
(52) U.S. Cl. ........................................ 320/104
(58) Field of Classification Search ................ 320/101, 320/104, 112, 137; 322/1, 2 R, 4; 290/50, 290/54; 310/75 C, 80
See application file for complete search history.

(56) References Cited

U.S. PATENT DOCUMENTS

| | | | | |
|---|---|---|---|---|
| 4,555,656 A | * | 11/1985 | Ryan | 322/1 |
| 4,637,274 A | * | 1/1987 | Goldenfeld | 74/625 |
| 4,950,971 A | * | 8/1990 | Hegi et al. | 322/1 |
| 5,015,869 A | * | 5/1991 | Schurmann et al. | 290/1 R |
| 5,571,056 A | * | 11/1996 | Gilbert | 474/80 |
| 5,857,762 A | * | 1/1999 | Schwaller | 362/473 |
| 5,932,943 A | * | 8/1999 | Werner et al. | 310/67 A |
| 5,992,553 A | * | 11/1999 | Morrison | 180/206 |
| 6,104,096 A | * | 8/2000 | Hicks | 290/1 R |
| 6,118,196 A | * | 9/2000 | Cheng-Yon | 310/75 C |
| 6,418,041 B1 | * | 7/2002 | Kitamura | 363/125 |
| 6,502,842 B2 | * | 1/2003 | Ko | 280/215 |
| 2003/0024339 A1 | * | 2/2003 | Fujii | 74/501.6 |

* cited by examiner

*Primary Examiner*—Edward H Tso
(74) *Attorney, Agent, or Firm*—Gary Baker; Quine Intellectual Property Law Group, P.C.

(57) ABSTRACT

A derailler with a set of gears powered by bicycle chain to drive an AC generator. A bridge rectifier to convert AC to DC to charge the battery and to energize the head light and the tail light. A set of switches to control the head light, tail light, and battery.

4 Claims, 4 Drawing Sheets

Bicycle Charging Circuit

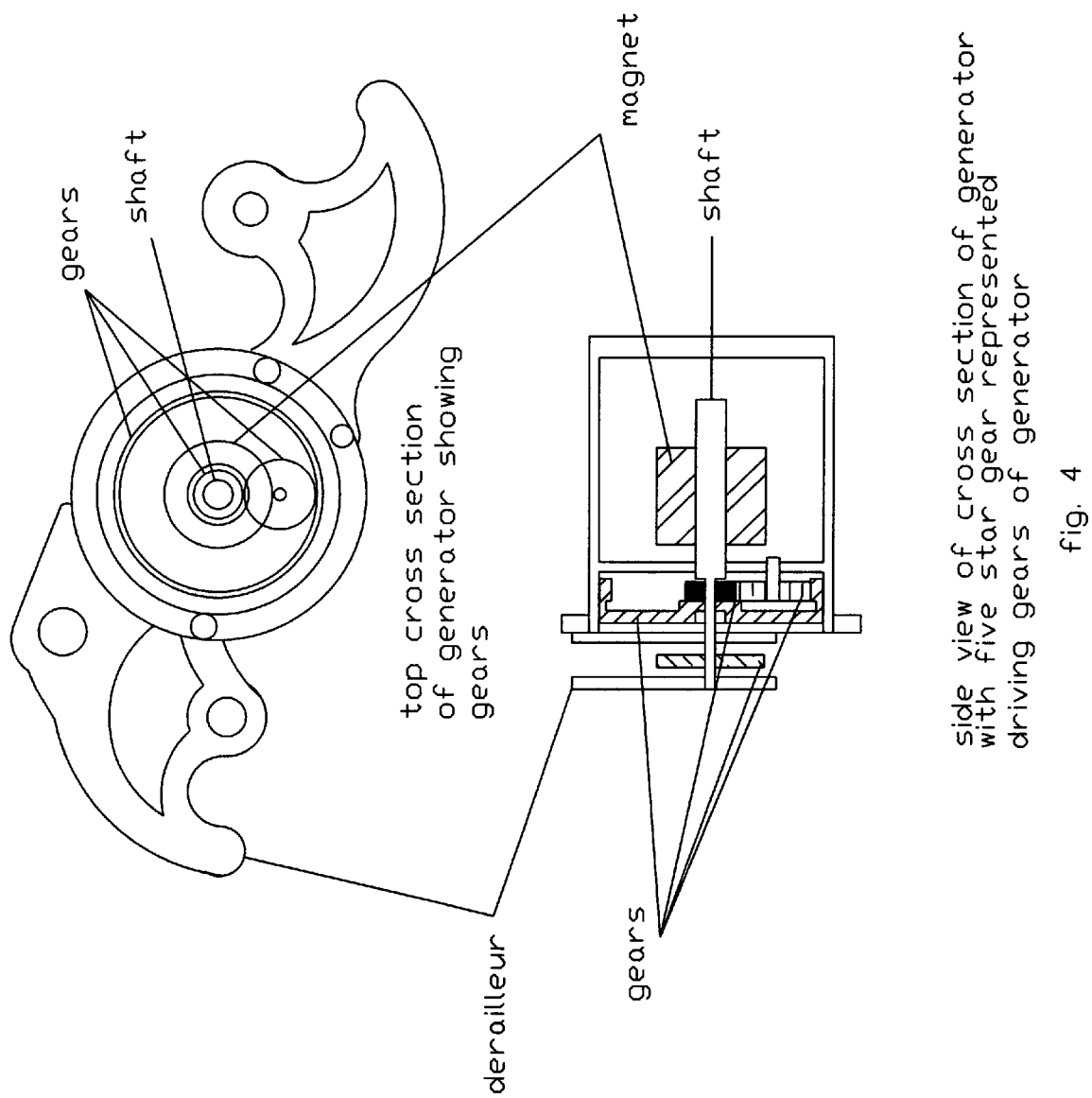

BICYCLE DERAILER GENERATOR

BACKGROUND OF INVENTION

This invention relates to the field of bicycle lights, a chain driven generator. There are so many gadgets on the market today that use house hold power to charge batteries that power all sorts of toys, flashlights, bicycle lights, and tools.

So many bicyclists are confronted with the problem of being visible at all times, in good and bad weather; and at night. There is a need to illuminate their path at the same time enable other motorists to see them.

Today's market relies on rechargeable batteries to power lights. We see some of these gadgets strapped to the bicycle handle bar, some are strapped to the head of the cyclist and others are on their backs with flashing LED's. The answer lies in the automobile system that is self sustaining. We can do the same with bicycles.

SUMMARY OF THE DISCLOSURES

A derailler that keeps the generator in contact with the bicycle chain at all times as you shift from gear to gear.

3 gears that drive the generator One gear taps power from the chain.

Two gears increase the generator RPM. A drive shaft on which are mounted 2 gears.

One on the chain side and the other on the generator side.

A generator attached to a derailler to tap power from the bicycle chain.

A parallel electrical circuit from the generator, to the bridge rectifier, to the head and tail-lights and to the battery.

4 diodes for the bridge

A relay to switch from DC to AC for the tail-light. 2 switches to turn DC/AC on or off.

Bridge rectifier and capacitor to charge batteries and power lights.

Rechargeable batteries connected to the generator and lights

OBJECT OF INVENTION

The object of this project is to stop worrying about when to ride a bicycle and for how long because of battery limitations.

The idea is to create a charging system that has controlled RPM so that bulbs don't burn out fast. The generator RPM is low and this eliminates the annoying noise created by the friction between the generator wheel and the bicycle wheel at high RPM.

Previous bicycle generators have been wheel driven with no control on RPM. This system taps power from a derailler where the chains are pedal powered.

BRIEF DESCRIPTION OF THE DRAWINGS

FIG. 4 shows side view of the generator and gears.

OPERATION OF THE SYSTEM

Figure 1:
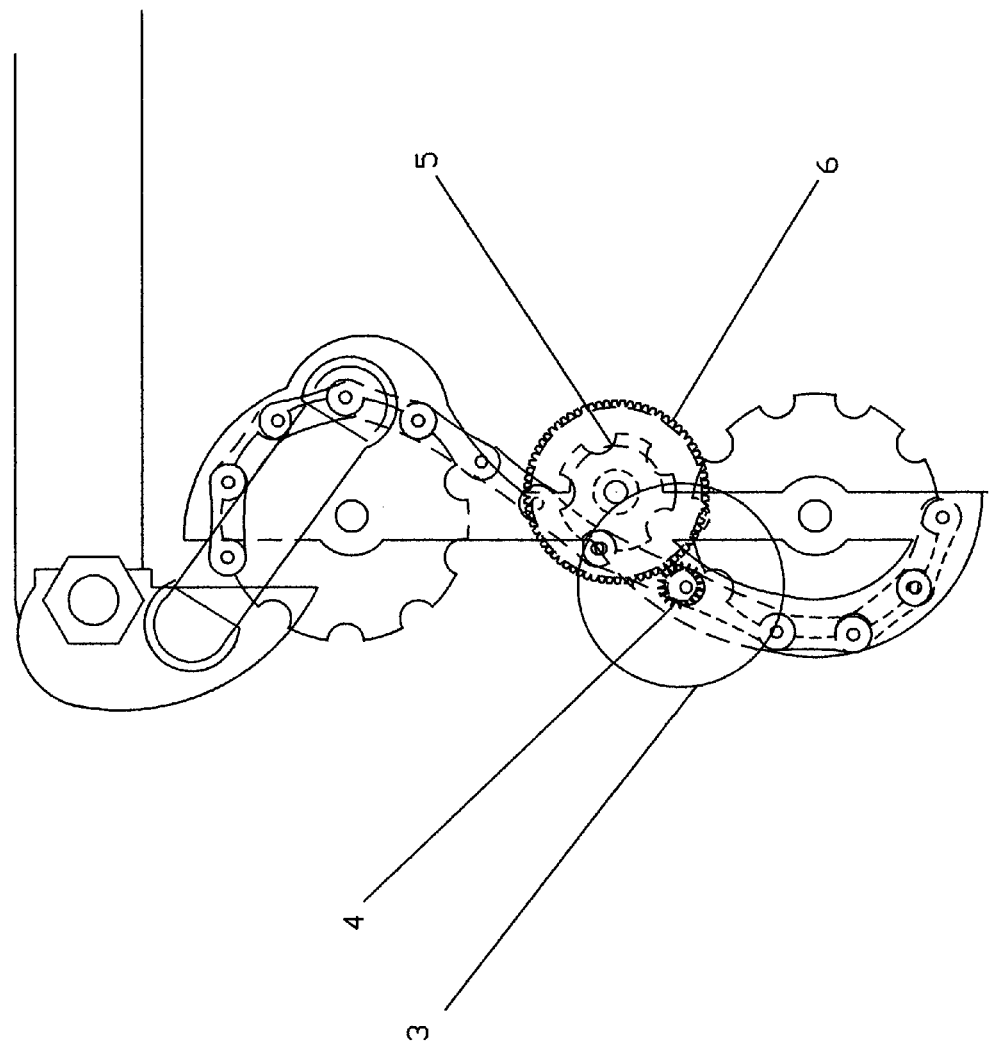
FIG. 1 shows a schematic diagram of a bicycle derailer Generator of the invention.
Figure 2:
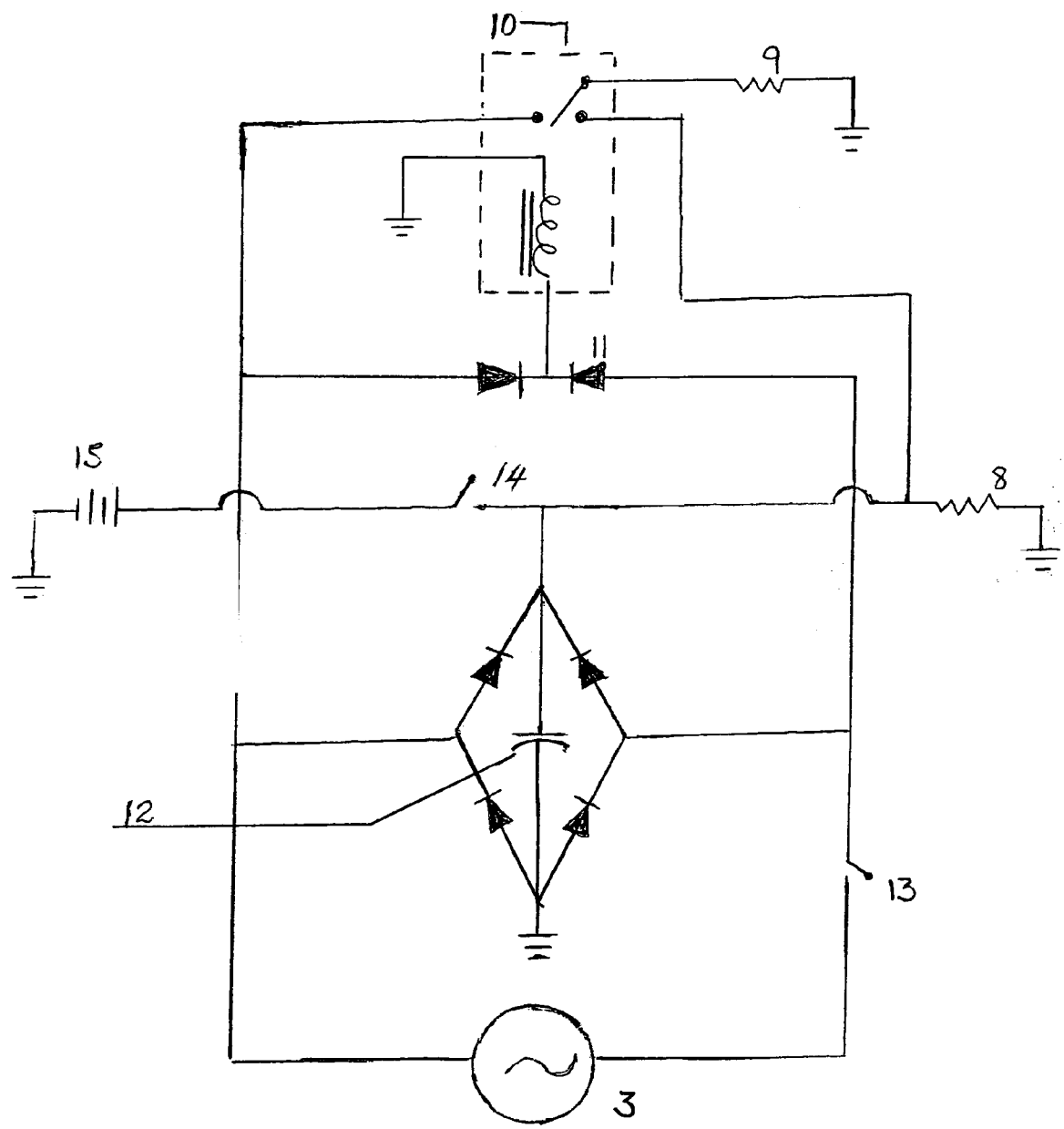
FIG. 2 shows a schematic diagram of an exemplary bicycle charging circuit.
Figure 3:
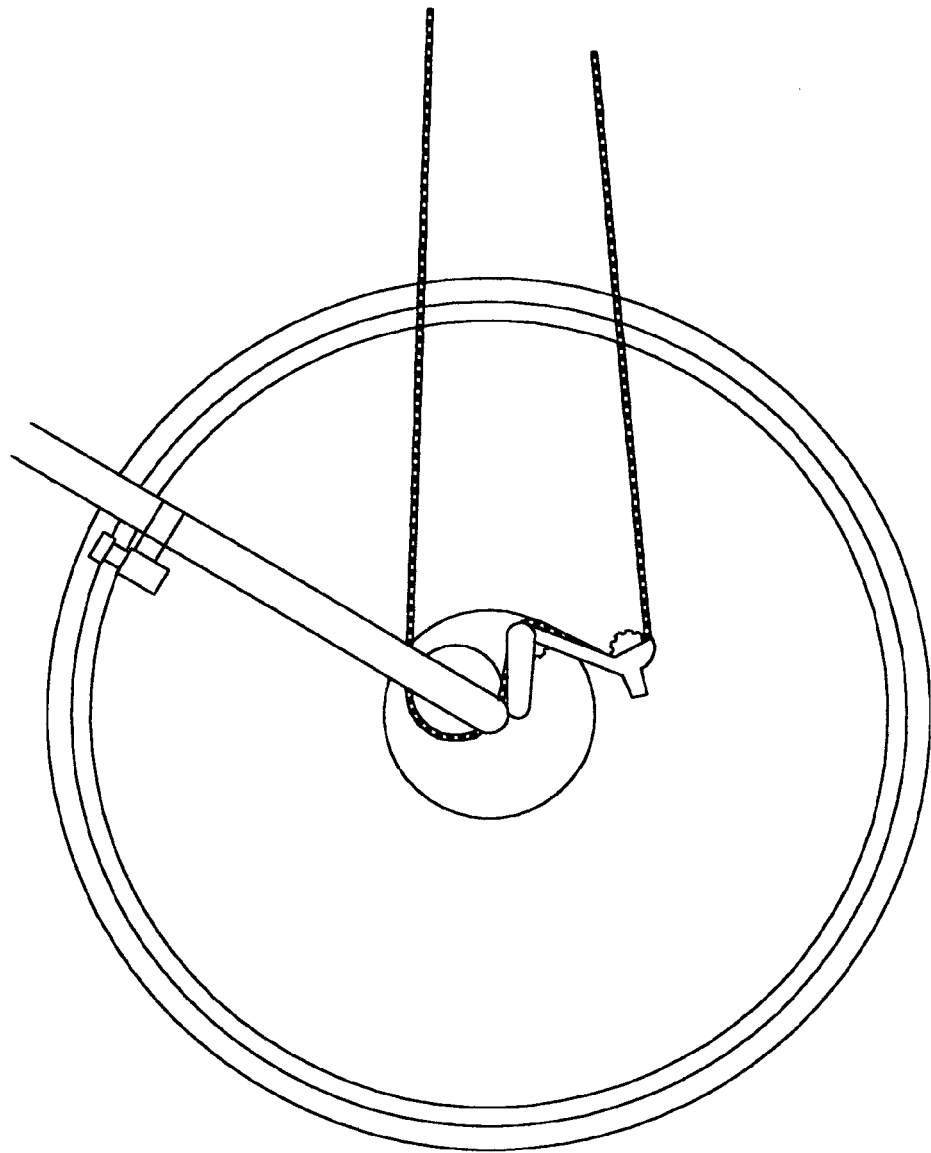
FIG. 3 shows a schematic diagram of a prior art generator not mounted to a derailer.

The power comes from the pedals. As the chains move they put into motion the chain gear 5. This in turn rotates the gear outside (drive gear) 6, which then turns the generator gear 4 and thereby cause electricity to be generated. The electrical circuit FIG. 2 conveys the energy to the bridge rectifier which charges the battery 15 and energizes lights 8 &9.

The 2 switches 13 & 14 are used to enable or disable the lights 8 & 9, the generator 3 or the battery 15.

The invention claimed is:

1. A bicycle lighting system comprising:
    a generator mounted to a derailler and comprising one or more gears driven by a chain running through the derailler; and,
    a headlight or taillight in electrical contact with the generator;
    whereby movement of the chain through the derailler turns the one or more gears and the generator to provide electrical current to the headlight or taillight.

2. The system of claim 1, wherein the headlight or taillight is in electrical contact with the generator comprises a bridge rectifier and a capacitor.

3. The system of claim 1, further comprising a rechargeable battery in electrical contact with the generator or in electrical contact with the headlight or taillight.

4. The system of claim 1, further comprising one or more switches controlling the electrical current to the headlight or taillight.

\* \* \* \* \*